United States Patent
Tupaika et al.

(10) Patent No.: US 7,035,533 B2
(45) Date of Patent: Apr. 25, 2006

(54) ELECTRICAL RESISTANCE HEATING ELEMENT WITH A HONEYCOMB BODY

(75) Inventors: Friedhelm Tupaika, Waltersdorf (DE); Hans-Juergen Voigtsberger, Bad Klosterlausnitz (DE); Dieter Gruetzmann, Stadtroda (DE)

(73) Assignee: Hermsdorfer Institut Fuer Technische Keramik E.V., Hermsdorf (DE)

( * ) Notice: Subject to any disclaimer, the term of this patent is extended or adjusted under 35 U.S.C. 154(b) by 0 days.

(21) Appl. No.: 10/498,733

(22) PCT Filed: Dec. 15, 2001

(86) PCT No.: PCT/EP01/14834

§ 371 (c)(1),
(2), (4) Date: Aug. 11, 2004

(87) PCT Pub. No.: WO03/053100

PCT Pub. Date: Jun. 26, 2003

(65) Prior Publication Data

US 2005/0077279 A1    Apr. 14, 2005

(51) Int. Cl.
*F24H 1/10* (2006.01)
(52) U.S. Cl. .................. 392/485; 392/491; 392/502
(58) Field of Classification Search ............ 392/485, 392/491, 502
See application file for complete search history.

(56) References Cited

U.S. PATENT DOCUMENTS 4,107,515 A    8/1978    Kulwicki
4,180,901 A    1/1980    Kulwicki
4,264,888 A    4/1981    Berg
4,570,046 A    2/1986    Melanson et al.
4,717,813 A    1/1988    Berg et al.
4,866,365 A    9/1989    Offiler et al.

FOREIGN PATENT DOCUMENTS

DE    30 16 725       11/1980
DE    2-129887         5/1990
DE    198 04496        8/1999

OTHER PUBLICATIONS

Mar. 2000 "PTC Finned Resistor Heating Elements" DBK David + Bader GmbH.

*Primary Examiner*—Thor S. Campbell
(74) *Attorney, Agent, or Firm*—Jordan and Hamburg LLP

(57) ABSTRACT

The aim of the invention is the application of simple production methods for electrical resistance heating elements with a honeycomb body and use total capacity with regard to the specific electrical power per volume unit. Said aim is achieved for an electrical resistance heating element with a honeycomb body of resistance material with positive temperature coefficients for the resistance (PTC resistance), in which the channels, for throughflow of a medium for heating, comprise metallised walls and are electrically alternately contacted after the fashion of a chess-board on the front faces of the honeycomb body by means of a front face metallisation, whereby an insulation region (1) is alternately let into the metallisation (3) on the walls of the channels running from the front faces, whilst the front face metallisation (2) completely covers the front faces. Possible fields of application for the above (without limitation thereto) are particularly additional heaters and windscreen heaters in motor vehicles or small, self-regulating and rapidly-responding room space heaters.

2 Claims, 1 Drawing Sheet

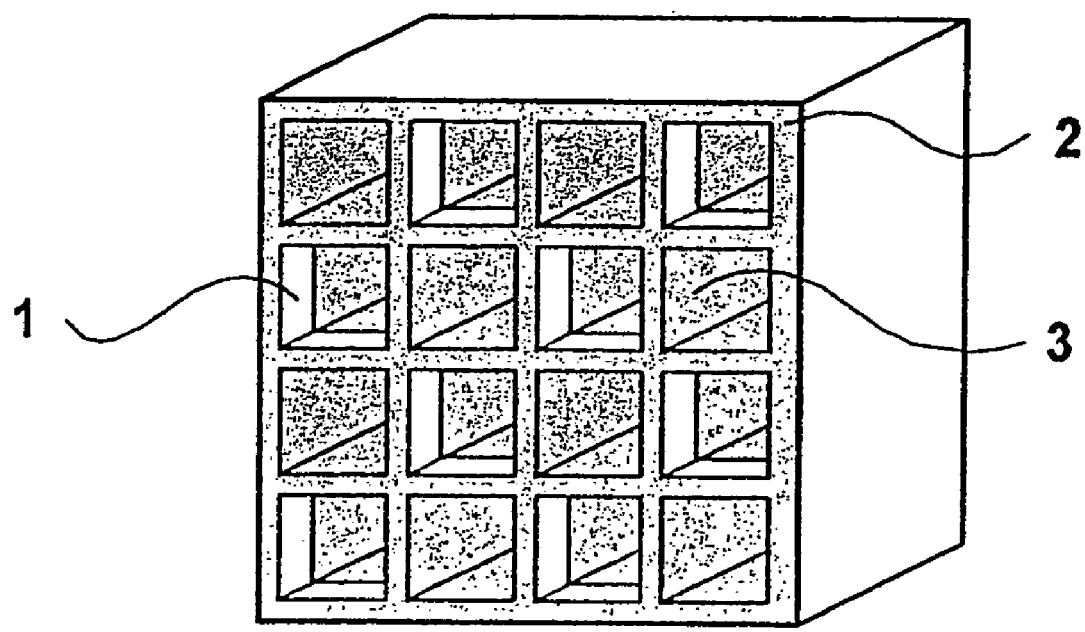

ELECTRICAL RESISTANCE HEATING ELEMENT WITH A HONEYCOMB BODY

The invention relates to an electrical resistance heating element with a honeycomb body made of resistance material with positive temperature coefficients (PTC resistance). Such heating elements use the possible internal contact of a fluid conducted through the channels of the honeycomb body with the site at which the heat occurs, whereby good heat transmission is achieved, and also use the current-limiting effect of the PTC resistances, which automatically prevents any overheating of the resistance heating element without any additional regulating elements. When the operating current can be conducted through the walls of the honeycomb body channels quasi-transversely to the direction of flow of the fluid, the applicable operating voltage interval clearly increases and essentially depends on the specific material parameters. There is a greater degree of freedom in dimensioning, since the realizable channel length is very limited with current flow in the channel direction, even for a power supply.

One technical solution that has become known that is not based on a honeycomb body but that approaches it in terms of the heat exchange principle and that also contains PTC resistances is comprised in that rectangular PTC bodies are alternately coated with meandering corrugated metal strips and compressed. The metal strips supply the current for the PTC body and also act as heat exchangers in that a fluid flows through them transverse to the flat stack (Company publication, "PTC cold conductor/heat register, Type HR 02", David+Bader GmbH, Kandel). This arrangement suffers from the two following principal deficiencies. The non-positive electrical contacting is technologically complex and can lead to irregular temperature distribution due to transition resistances despite the self-regulating effect of PTC resistances described in the foregoing. The same applies to the heat stream in the direction from the PTC body to the metal strips, whereby it also becomes immediately apparent that the heat exchange occurs indirectly at the corrugated metal strips, not directly at the site at which the heat occurs.

Furthermore known is a honeycomb body for electrical heating in which the corrugated layers of a typical semiconducting ceramic alternate with layers made of metal or materials containing graphite that are intended to act as current feeds (Patent Abstract of Japan no. 02 129 887 A). Apart from the fact that the preferred embodiment in this publication cites as resistance materials silicon and titanium carbides and suicides, whose electrical resistance decreases as voltage increases so that they lack the aforesaid self-limiting effect, such a surface fit combination of different materials is difficult to produce and the durability of its individual components can suffer given different heat expansion behaviors.

A PTC honeycomb body with channels interiorly metallized on all sides for application in an automobile heater system is also known, whereby contacting is indicated, first, by metallizing the exterior wall of the honeycomb body, and second, by connecting wires that extend into the initial area of each channel (U.S. Pat. No. 4,866,365). When the channel dimensions are small, contacting using connecting wires is very problematic in terms of production engineering and also interferes with the flow ratio in the channels in an adverse manner.

Furthermore known is a PTC honeycomb body with channels interiorly metallized on all sides for heating gas flowing therethrough in which the electrical contacting of the metallized channel walls occurs via end face-side slits that are in the channel walls and that are also metallized, whereby these channels are interconnected in a diagonal direction in order to create the required checkerboard polarity (DE 30 16 725 A1). This technical solution is also disadvantageous for production engineering reasons and due to the flow ratios. In addition, the stability of the honeycomb body might also be adversely impacted due to the notch effect of the slits.

Finally, resistance heating elements of the aforesaid type are known in which the contacting occurs exclusively through a contacting pattern or another surface-like contacting arrangement on continuous flat end faces, specifically for direct current corresponding to the known checkerboard arrangement (DE 198 04 496 A1) and for rotary current by means of very special metallizing patterns, preferably but not exclusively in channels with a triangular or hexagonal cross-section (U.S. Pat. No. 4,717,813 A). These arrangements have the following disadvantages:

The width of the strip conductors on the end faces is limited geometrically by the wall thickness of the honeycomb body, whereby in addition the required insulation distance to the channels with electrically opposite poles must also be maintained.

The interior contacting of the channels in principle makes possible higher specific electrical power of such resistance heating elements, whereby however necessarily higher currents are required in the contacting patterns so that the highest current densities occur there based on design.

The maximum permissible current load of the contacting pattern leads to a limit of the power spectrum, that would otherwise be possible in principal, of the resistance heating elements with honeycomb body.

The production methods for applying the filigree strip conductors of the contacting pattern are very complex, and, due to the production tolerances and the application methods for the strip conductors and due also to the thickness of the channel walls of the honeycomb body, these must be embodied even narrower than would actually be necessary for electrically insulating the opposite poles.

The object of the invention is to make possible simpler production methods for electrical resistance heating elements of the type specified in the foregoing and to exhaust the reserves of such resistance heating elements in accordance with the prior art with respect to the specific electrical power per unit of volume.

This object is achieved by the invention described in the patent claims.

The invention achieves the following advantages:

The metallization of the channel walls is conducted just on one side to the end face and is contacted there. On the other side, the metallization terminates a specific distance before the end face, resulting in insulation. 1 mm is an adequate distance for extra-low voltage.

The contacting and non-contacting of the metallization of the walls of the channels alternate in a checkerboard pattern, so that the operating voltage is applied between two adjacent channels.

The inventively continuous metallization of the end faces leads to substantially higher current-carrying capacity and thus permits the required exhaustion of the power spectrum of this type of electrical resistance heating element.

The inventively continuous metallization of the end faces is much simpler in terms of production engineering than applying fine conductor strip structures, as is provided in the invention in the most closely related prior art.

Interesting areas of application for the invention result from heating motor vehicles, without being restricted thereto, such as for instance supplementary heating for motor vehicles, when the heat from modern economic combustion engines is not adequate for heating;
rapid front windshield heating when the engine is cold;
sole heating in electrical vehicles.

Additional application options, which likewise are not restrictive, result for small, self-regulating, and rapidly responding space heaters.

BRIEF DESCRIPTION OF DRAWING

The invention is described in the following using an exemplary embodiment. The attached drawing is a schematic perspective view of an inventive resistance heating element.

Regardless of the technical embodiment of the invention-essential contacting, a suitable honeycomb body material and its manufacture will first be described as an example. Such a material is a ceramic material that correspond to the following total chemical formula:

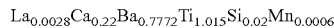

$La_{0.0028}Ca_{0.22}Ba_{0.7772}Ti_{1.015}Si_{0.02}Mn_{0.0006}$

The initial materials (generally compounds that can be broken down into oxides, such as carbonates, acetates, etc.) are mixed intensively and then carefully annealed for forming the oxides. Grinding follows, and finally, with conventional plasticizers, it is extruded into honeycomb bodies followed by ceramic firing.

The finished ceramic has the following electrical properties:

| | |
|---|---|
| Specific resistance at 20° C.: | 50 Ωcm |
| $R_{max}/R_{min}$: | 2.2 × 10⁵ |
| Tc: | 100° C. |
| $T_{max}$: | 232° C. |
| Electric strength | >150 V/mm |

The attached drawing speaks largely for itself. The schematically represented honeycomb body with rectangular channel cross-sections has gray-shadowed metallizations, namely continuous on the end faces (of course, only one of these is visible (it is labeled 2)) and on the walls of the channels (labeled 3). The blank insulation areas 1 are essential to the invention; it should be noted that of course it should be assured that there is a good electrical connection between the metallizations 2 and 3 at sites where no insulating area 1 is provided, as in the channel labeled 3.

The invention claimed is:

1. Electrical heating resistance element comprising:
   a honeycomb body comprising;
      electrical resistance material having positive temperature coefficients of resistance;
      channels through which medium to be heated flows; and
      end faces and metallized channel walls;
   the end faces being completely covered by metallization;
   the metallized walls of a first set of the channels forming a first checkerboard pattern, said walls of said first set being electrically connected by the metallization of only one of the end faces and being insulated from the other of the end faces;
   the metallized walls of a second set of the channels forming a second checkerboard pattern complementary to the first checkerboard pattern; and
   the walls of the second set of channels being insulated from the metallization of said one of the end faces and electrically connected to the metallization of said other of the end faces.

2. The element of claim 1 further comprising insulating edges disposed entirely within said channels.

* * * * *